US007961926B2

(12) United States Patent
Viswanathan

(10) Patent No.: US 7,961,926 B2
(45) Date of Patent: Jun. 14, 2011

(54) REGISTRATION OF THREE-DIMENSIONAL IMAGE DATA TO 2D-IMAGE-DERIVED DATA

(75) Inventor: Raju R. Viswanathan, St. Louis, MO (US)

(73) Assignee: Stereotaxis, Inc., St. Louis, MO (US)

( * ) Notice: Subject to any disclaimer, the term of this patent is extended or adjusted under 35 U.S.C. 154(b) by 0 days.

(21) Appl. No.: 12/835,211

(22) Filed: Jul. 13, 2010

(65) Prior Publication Data

US 2011/0033100 A1 Feb. 10, 2011

Related U.S. Application Data

(62) Division of application No. 11/349,548, filed on Feb. 7, 2006, now Pat. No. 7,756,308.

(60) Provisional application No. 60/650,616, filed on Feb. 7, 2005.

(51) Int. Cl.
*G06K 9/00* (2006.01)
(52) U.S. Cl. ...................................... 382/128
(58) Field of Classification Search .......... 382/128–134; 128/920–930; 250/455–465; 356/39–49; 600/407, 408, 409, 410, 411, 412, 413, 414, 600/424, 425, 426
See application file for complete search history.

(56) References Cited

U.S. PATENT DOCUMENTS

| | | | |
|---|---|---|---|
| 5,353,807 A | 10/1994 | DeMarco | |
| 5,654,864 A | 8/1997 | Ritter et al. | |
| 5,707,335 A | 1/1998 | Howard et al. | |
| 5,779,694 A | 7/1998 | Howard et al. | |
| 5,931,818 A | 8/1999 | Werp et al. | |
| 6,014,580 A | 1/2000 | Blume et al. | |
| 6,015,414 A | 1/2000 | Werp et al. | |
| 6,128,174 A | 10/2000 | Ritter et al. | |
| 6,148,823 A | 11/2000 | Hastings | |
| 6,152,933 A | 11/2000 | Werp et al. | |
| 6,157,853 A | 12/2000 | Blume et al. | |
| 6,212,419 B1 | 4/2001 | Blume et al. | |
| 6,241,671 B1 | 6/2001 | Ritter et al. | |
| 6,272,370 B1 | 8/2001 | Gillies et al. | |

(Continued)

OTHER PUBLICATIONS

Magnetic Manipulation Instrumentation for Medical Physics Research Authors: G. T. Gillies, R. C. Ritter, W. C. Broaddus, M. S. Grady, M. A. Howard, III, R. G. McNeil 1994 American Institute of Physics Rev. Sci. Instrum. vol. 65, No. 3, Mar. 1994 pp. 533-562.

*Primary Examiner* — Samir A Ahmed
*Assistant Examiner* — Atiba O Fitzpatrick
(74) *Attorney, Agent, or Firm* — Harness, Dickey & Pierce, P.L.C.

(57) ABSTRACT

A method for obtaining registration of a three-dimensional image data set of an anatomical vessel with corresponding two-dimensional image data of the vessel in an X-ray imaging system, where the method comprise the user identifying two points on an anatomical vessel on at least two X-ray image planes, the user identifying two similar points on the surface of the corresponding three-dimensional anatomical image data, determining the orientation direction of the vessel from the two user identified image data surface points, determining the orientation direction of the vessel from the two points obtained from the X-ray image planes, and calculating a transformation of the three-dimensional image data to obtain a best fit registration of the direction derived from the image surface points with the direction derived from the X-ray image data points.

14 Claims, 2 Drawing Sheets

U.S. PATENT DOCUMENTS

| | | |
|---|---|---|
| 6,292,678 B1 | 9/2001 | Hall et al. |
| 6,296,604 B1 | 10/2001 | Garibaldi et al. |
| 6,298,257 B1 | 10/2001 | Hall et al. |
| 6,298,259 B1 | 10/2001 | Kucharczyk et al. |
| 6,304,768 B1 | 10/2001 | Blume et al. |
| 6,311,082 B1 | 10/2001 | Creighton, IV et al. |
| 6,315,709 B1 | 11/2001 | Garibaldi et al. |
| 6,330,467 B1 | 12/2001 | Creighton, IV et al. |
| 6,352,363 B1 | 3/2002 | Munger et al. |
| 6,364,823 B1 | 4/2002 | Garibaldi et al. |
| 6,375,606 B1 | 4/2002 | Garibaldi et al. |
| 6,385,472 B1 | 5/2002 | Hall et al. |
| 6,401,723 B1 | 6/2002 | Garibaldi et al. |
| 6,428,551 B1 | 8/2002 | Hall et al. |
| 6,459,924 B1 | 10/2002 | Creighton, IV et al. |
| 6,475,223 B1 | 11/2002 | Werp et al. |
| 6,505,062 B1 | 1/2003 | Ritter et al. |
| 6,507,751 B2 | 1/2003 | Blume et al. |
| 6,522,909 B1 | 2/2003 | Garibaldi et al. |
| 6,524,303 B1 | 2/2003 | Garibaldi |
| 6,527,782 B2 | 3/2003 | Hogg et al. |
| 6,529,761 B2 | 3/2003 | Creighton, IV et al. |
| 6,537,196 B1 | 3/2003 | Creighton, IV et al. |
| 6,542,766 B2 | 4/2003 | Hall et al. |
| 6,562,019 B1 | 5/2003 | Sell |
| 6,630,879 B1 | 10/2003 | Creighton, IV et al. |
| 6,662,034 B2 | 12/2003 | Segner et al. |
| 6,677,752 B1 | 1/2004 | Creighton, IV et al. |
| 6,702,804 B1 | 3/2004 | Ritter et al. |
| 6,733,511 B2 | 5/2004 | Hall et al. |
| 6,740,103 B2 | 5/2004 | Hall et al. |
| 6,755,816 B2 | 6/2004 | Ritter et al. |
| 6,786,219 B2 | 9/2004 | Garibaldi et al. |
| 6,817,364 B2 | 11/2004 | Garibaldi et al. |
| 6,834,201 B2 | 12/2004 | Gillies et al. |
| 6,902,528 B1 | 6/2005 | Garibaldi et al. |
| 6,911,026 B1 | 6/2005 | Hall et al. |
| 6,940,379 B2 | 9/2005 | Creighton |
| 6,968,846 B2 | 11/2005 | Viswanathan |
| 6,975,197 B2 | 12/2005 | Creighton, IV |
| 6,980,843 B2 | 12/2005 | Eng et al. |
| 7,008,418 B2 | 3/2006 | Hall et al. |
| 7,010,338 B2 | 3/2006 | Ritter et al. |
| 7,017,584 B2 | 3/2006 | Garibaldi et al. |
| 7,019,610 B2 | 3/2006 | Creighton, IV et al. |
| 7,020,512 B2 | 3/2006 | Ritter et al. |
| 7,066,924 B1 | 6/2006 | Garibaldi et al. |
| 7,137,976 B2 | 11/2006 | Ritter et al. |
| 7,161,453 B2 | 1/2007 | Creighton, IV |
| 7,189,198 B2 | 3/2007 | Harburn et al. |
| 7,190,819 B2 | 3/2007 | Viswanathan |
| 7,211,082 B2 | 5/2007 | Hall et al |
| 7,248,914 B2 | 7/2007 | Hastings et al. |
| 7,264,584 B2 | 9/2007 | Ritter et al. |
| 7,276,044 B2 | 10/2007 | Ferry et al. |
| 7,286,034 B2 | 10/2007 | Creighton |
| 7,305,263 B2 | 12/2007 | Creighton, IV |
| 7,313,429 B2 | 12/2007 | Creighton, IV et al. |
| 7,341,063 B2 | 3/2008 | Garibibaldi et al. |
| 7,346,379 B2 | 3/2008 | Eng et al. |
| 7,389,778 B2 | 6/2008 | Sabo et al. |
| 7,416,335 B2 | 8/2008 | Munger |
| 7,495,537 B2 | 2/2009 | Tunay |
| 7,505,615 B2 | 3/2009 | Viswanathan |
| 7,516,416 B2 | 4/2009 | Viswanathan et al. |
| 7,537,570 B2 | 5/2009 | Kastelein |
| 7,540,288 B2 | 6/2009 | Viswanathan et al. |
| 7,540,866 B2 | 6/2009 | Viswanathan et al. |
| 7,543,239 B2 | 6/2009 | Viswanathan et al. |
| 7,555,331 B2 | 6/2009 | Viswanathan |
| 7,567,233 B2 | 7/2009 | Garibaldi et al. |
| 7,603,905 B2 | 10/2009 | Creighton, IV |
| 7,623,736 B2 | 11/2009 | Viswanathan |
| 7,625,382 B2 | 12/2009 | Werp et al. |
| 7,627,361 B2 | 12/2009 | Viswanathan |
| 7,630,752 B2 | 12/2009 | Viswanathan |
| 7,635,342 B2 | 12/2009 | Ferry et al. |
| 7,657,075 B2 | 2/2010 | Viswanathan |
| 7,662,126 B2 | 2/2010 | Creighton, IV |
| 7,690,619 B2 | 4/2010 | Wolfersberger |
| 7,708,696 B2 | 5/2010 | Ritter et al. |
| 7,742,803 B2 | 6/2010 | Viswanathan et al. |
| 7,747,960 B2 | 6/2010 | Garibaldi et al. |
| 7,751,867 B2 | 7/2010 | Viswanathan et al. |
| 7,756,308 B2 | 7/2010 | Viswanathan |
| 7,757,694 B2 | 7/2010 | Ritter et al. |
| 7,761,133 B2 | 7/2010 | Viswanathan et al. |
| 7,766,856 B2 | 8/2010 | Ferry et al. |
| 7,769,428 B2 | 8/2010 | Viswanathan et al. |
| 7,769,444 B2 | 8/2010 | Pappone |
| 7,771,415 B2 | 8/2010 | Ritter et al. |
| 7,771,437 B2 | 8/2010 | Hogg et al. |
| 7,772,950 B2 | 8/2010 | Tunay |
| 7,774,046 B2 | 8/2010 | Werp et al. |
| 7,815,580 B2 | 10/2010 | Viswanathan |
| 7,818,076 B2 | 10/2010 | Viswanathan |
| 2001/0038683 A1 | 11/2001 | Ritter et al. |
| 2002/0019644 A1 | 2/2002 | Hastings et al. |
| 2002/0100486 A1 | 8/2002 | Creighton, IV et al. |
| 2003/0181809 A1 | 9/2003 | Hall et al. |
| 2004/0006301 A1 | 1/2004 | Sell et al. |
| 2004/0019447 A1 | 1/2004 | Shachar |
| 2004/0030244 A1 | 2/2004 | Garibaldi et al. |
| 2004/0064153 A1 | 4/2004 | Creighton, IV et al. |
| 2004/0133130 A1 | 7/2004 | Ferry et al. |
| 2004/0147829 A1 | 7/2004 | Segner et al. |
| 2004/0157082 A1 | 8/2004 | Ritter et al. |
| 2004/0158972 A1 | 8/2004 | Creighton, IV et al. |
| 2004/0186376 A1 | 9/2004 | Hogg et al. |
| 2004/0260172 A1 | 12/2004 | Ritter et al. |
| 2004/0267106 A1 | 12/2004 | Segner et al. |
| 2005/0004585 A1 | 1/2005 | Hall et al. |
| 2005/0020911 A1 | 1/2005 | Viswanathan et al. |
| 2005/0021063 A1 | 1/2005 | Hall et al. |
| 2005/0033162 A1 | 2/2005 | Garibaldi et al. |
| 2005/0065435 A1 | 3/2005 | Rauch et al. |
| 2005/0096589 A1 | 5/2005 | Shachar |
| 2005/0113812 A1 | 5/2005 | Viswanathan et al. |
| 2005/0119556 A1 | 6/2005 | Gillies et al. |
| 2005/0119687 A1 | 6/2005 | Dacey, Jr. et al. |
| 2005/0182315 A1 | 8/2005 | Ritter et al. |
| 2005/0256398 A1 | 11/2005 | Hastings et al. |
| 2005/0273130 A1 | 12/2005 | Sell |
| 2006/0025675 A1 | 2/2006 | Viswanathan et al. |
| 2006/0025679 A1 | 2/2006 | Viswanathan et al. |
| 2006/0025719 A1 | 2/2006 | Viswanathan et al. |
| 2006/0036163 A1 | 2/2006 | Viswanathan |
| 2006/0036167 A1 | 2/2006 | Shina |
| 2006/0036213 A1 | 2/2006 | Viswanathan et al. |
| 2006/0041181 A1 | 2/2006 | Viswanathan et al. |
| 2006/0094956 A1 | 5/2006 | Viswanathan |
| 2006/0100505 A1 | 5/2006 | Viswanathan |
| 2006/0114088 A1 | 6/2006 | Shachar |
| 2006/0116633 A1 | 6/2006 | Shachar |
| 2006/0144407 A1 | 7/2006 | Aliberto et al. |
| 2006/0144408 A1 | 7/2006 | Ferry |
| 2006/0270948 A1 | 11/2006 | Viswanathan et al. |
| 2006/0278248 A1 | 12/2006 | Viswanathan |
| 2007/0016010 A1 | 1/2007 | Creighton, IV et al. |
| 2007/0016131 A1 | 1/2007 | Munger et al. |
| 2007/0021731 A1 | 1/2007 | Garibaldi et al. |
| 2007/0021742 A1 | 1/2007 | Viswanathan |
| 2007/0021744 A1 | 1/2007 | Creighton, IV |
| 2007/0032746 A1 | 2/2007 | Sell |
| 2007/0038065 A1 | 2/2007 | Creighton, IV et al. |
| 2007/0038074 A1 | 2/2007 | Ritter et al. |
| 2007/0040670 A1 | 2/2007 | Viswanathan |
| 2007/0043455 A1 | 2/2007 | Viswanathan et al. |
| 2007/0049909 A1 | 3/2007 | Munger |
| 2007/0055124 A1 | 3/2007 | Viswanathan et al. |
| 2007/0060829 A1 | 3/2007 | Pappone |
| 2007/0060916 A1 | 3/2007 | Pappone |
| 2007/0060962 A1 | 3/2007 | Pappone |
| 2007/0060992 A1 | 3/2007 | Pappone |
| 2007/0062546 A1 | 3/2007 | Viswanathan et al. |
| 2007/0062547 A1 | 3/2007 | Pappone |
| 2007/0073288 A1 | 3/2007 | Hall et al. |

| | | | | | | |
|---|---|---|---|---|---|---|
| 2007/0123964 A1 | 5/2007 | Davies et al. | | 2008/0097200 A1 | 4/2008 | Blume et al. |
| 2007/0146106 A1 | 6/2007 | Creighton, IV | | 2008/0114335 A1 | 5/2008 | Flickinger et al. |
| 2007/0149946 A1 | 6/2007 | Viswanathan | | 2008/0132910 A1 | 6/2008 | Pappone |
| 2007/0161882 A1 | 7/2007 | Pappone | | 2008/0200913 A1 | 8/2008 | Viswanathan |
| 2007/0167720 A1 | 7/2007 | Viswanathan | | 2008/0208912 A1 | 8/2008 | Garibaldi |
| 2007/0179492 A1 | 8/2007 | Pappone | | 2008/0228065 A1 | 9/2008 | Viswanathan et al. |
| 2007/0197899 A1 | 8/2007 | Ritter et al. | | 2008/0228068 A1 | 9/2008 | Viswanathan et al. |
| 2007/0197906 A1 | 8/2007 | Ritter | | 2008/0287909 A1 | 11/2008 | Viswanathan et al. |
| 2007/0225589 A1 | 9/2007 | Viswanathan | | 2008/0294232 A1 | 11/2008 | Viswanathan |
| 2007/0250041 A1 | 10/2007 | Werp | | 2008/0312673 A1 | 12/2008 | Viswanathan et al. |
| 2007/0270686 A1 | 11/2007 | Ritter et al. | | 2008/0319303 A1 | 12/2008 | Sabo et al. |
| 2008/0004595 A1 | 1/2008 | Viswanathan | | 2009/0012821 A1 | 1/2009 | Besson et al. |
| 2008/0006280 A1 | 1/2008 | Aliberto et al. | | 2009/0062646 A1 | 3/2009 | Creighton et al. |
| 2008/0015427 A1 | 1/2008 | Kastelein et al. | | 2009/0082722 A1 | 3/2009 | Munger et al. |
| 2008/0015670 A1 | 1/2008 | Pappone | | 2009/0105579 A1 | 4/2009 | Garibaldi |
| 2008/0016677 A1 | 1/2008 | Creighton, IV | | 2009/0105645 A1 | 4/2009 | Kidd et al. |
| 2008/0016678 A1 | 1/2008 | Creighton, IV et al. | | 2009/0131798 A1 | 5/2009 | Minar et al. |
| 2008/0039705 A1 | 2/2008 | Viswanathan | | 2009/0131927 A1 | 5/2009 | Kastelein et al. |
| 2008/0039830 A1 | 2/2008 | Munger et al. | | 2009/0138009 A1 | 5/2009 | Viswanathan et al. |
| 2008/0043902 A1 | 2/2008 | Viswanathan | | 2009/0177032 A1 | 7/2009 | Garibaldi et al. |
| 2008/0058608 A1 | 3/2008 | Garibaldi et al. | | 2009/0177037 A1 | 7/2009 | Sabo et al. |
| 2008/0058609 A1 | 3/2008 | Garibaldi et al. | | 2009/0306643 A1 | 12/2009 | Pappone et al. |
| 2008/0059598 A1 | 3/2008 | Garibaldi et al. | | 2010/0063385 A1 | 3/2010 | Garibaldi et al. |
| 2008/0064933 A1 | 3/2008 | Garibaldi et al. | | 2010/0097315 A1 | 4/2010 | Garibaldi et al. |
| 2008/0065061 A1 | 3/2008 | Viswanathan | | 2010/0163061 A1 | 7/2010 | Creighton |
| 2008/0077007 A1 | 3/2008 | Hastings et al. | | 2010/0168549 A1 | 7/2010 | Pappone |
| 2008/0092993 A1 | 4/2008 | Creighton, IV | | | | |

US 7,961,926 B2

REGISTRATION OF THREE-DIMENSIONAL IMAGE DATA TO 2D-IMAGE-DERIVED DATA

CROSS-REFERENCE TO RELATED APPLICATIONS

This is a divisional application of U.S. patent application Ser. No. 11/349,548, filed Feb. 7, 2006, which is now U.S. Pat. No. 7,756,308, issued Jul. 13, 2010, which claims the benefit of U.S. patent application Ser. No. 60/650,616, filed Feb. 7, 2005, the entire disclosure of which is incorporated herein by reference.

FIELD OF THE INVENTION

This invention relates to registration of three-dimensional data to a reference coordinate system, and more particularly to registration of three dimensional image data with an X-ray imaging coordinate system.

BACKGROUND OF THE INVENTION

Interventional medicine is the collection of medical procedures in which access to the site of treatment is made by navigation through one of the subject's blood vessels, body cavities or lumens. Interventional medicine technologies have been applied to manipulation of medical instruments which contact tissues during surgical navigation procedures, making these procedures more precise, repeatable and less dependent of the device manipulation skills of the physician. Some presently available interventional medical systems for directing the distal tip of a medical device from the proximal end of the medical device use computer-assisted navigation and a display means for providing a visual display of the medical device along with anatomical images obtained from a separate imaging apparatus. Such systems can provide a visual display of blood vessels and tissues, obtained from a Fluoroscopy (X-ray) imaging system for example, and can display a projection of the medical device being navigated to a target destination using a computer that controls the orientation of the distal tip of the medical device.

In some cases, it may be difficult for a physician to become oriented in a three dimensional setting using a display of a single-plane X-ray image projection. Enhancement or augmentation of the single-plane X-ray image may be required to aid the physician in visualizing the orientation of the medical device and three-dimensional tissue surfaces and objects in the body. A method is therefore desired for enhancing a display image of the medical device and anatomical surfaces to include three-dimensional images of surfaces and objects in the body. Likewise path information obtained from a three dimensional data set may be used to augment path information derived from two dimensional images for use in visualization, navigation and computer-controlled steering.

SUMMARY OF THE INVENTION

The present invention relates to a method for determining a transformation of a three-dimensional pre-operative image data set to obtain a registration of the three-dimensional image data with an X-ray image of a subject's body, in particular in the context of a remote navigation system. In one embodiment of the present invention, a method is provided for obtaining registration of a three-dimensional image data set of an anatomical vessel with corresponding two-dimensional image data of the vessel in an X-ray imaging system, where the method comprises identifying two points on an anatomical vessel on at least two X-ray image planes, identifying two similar points on the surface of the corresponding three-dimensional anatomical image data, determining the orientation direction of the vessel from the two identified image data surface points, determining the orientation direction of the vessel from the two points obtained from the at least two X-ray image planes, and calculating a transformation of the three-dimensional image data to obtain a best fit registration of the direction derived from the image surface points with the direction derived from the X-ray image data points.

Another embodiment of the present invention may further provide a method for automatically determining a centerline for the corresponding three-dimensional image data of the vessel using a software algorithm, determining a direction of the vessel from the two points obtained from the X-ray image planes, and calculating a transformation of the centerline direction derived from the three-dimensional image data to the direction derived from the X-ray image data points to obtain a registration of the three-dimensional image data with the two-dimensional image data of the X-ray imaging system.

Another embodiment of the present invention may provide a method for registration of three-dimensional anatomical image data with two-dimensional X-ray imaging system data to allow for overlay of pre-operative anatomical images onto the X-ray imaging planes.

Yet another embodiment of the present invention, may provide a method for registration of three dimensional anatomical image data with a three dimensional reconstruction that has been obtained from image processing of at least a pair of two dimensional images; or that has been obtained from user identification and marking of the anatomy on at least a pair of two dimensional images or the claims.

Further aspects of the present invention will become apparent from the detailed description provided hereinafter. It should be understood that the detailed description and specific examples, while indicating various embodiments and methods of the invention, are for illustration purposes only and are not intended to limit the scope of the invention.

BRIEF DESCRIPTION OF THE DRAWINGS

Corresponding reference numerals indicate corresponding parts throughout the several views of the drawings.

DETAILED DESCRIPTION OF THE INVENTION

Figure 1:
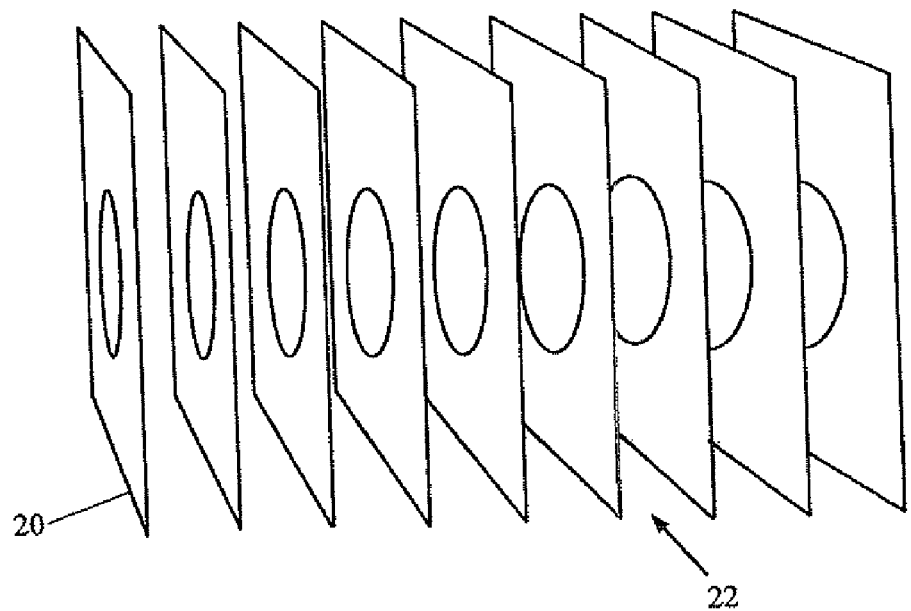
FIG. 1 is a series of cross-sectional images 20 of a three-dimensional volumetric image data set in accordance with the principles of the present invention.

In one embodiment of the present invention, a method is provided for determining a transformation of a three-dimensional pre-operative image data set to obtain a registration of the three-dimensional image data with an X-ray imaging system. As shown in FIG. 1, the preferred embodiment of the present invention relates to a method for processing a three dimensional pre-operative image data set to perform a transformation that will obtain a "registration" of a pre-operative image 20, such as a vessel, to an X-ray image system. The method comprises the step of initially processing the three-dimensional visual image data. This image processing can be a means of visualizing three-dimensional structures by a series of cross-sectional images. MRI, CT and volumetric ultrasound are examples of some common methods of obtaining three-dimensional volumetric or anatomical data of an image of a heart, brain, or other area of a human body. In minimally invasive medical procedures such as cardiac catheterizations, it is often important to be able to register this data to imaging data that is acquired during the procedure. X-ray images are the preferred and commonly used imaging modality in the cardiac CathLab. Thus, the image data obtained during the procedure is usually two dimensional X-ray imaging data.

It is possible to use 2D data taken from different X-ray C-arm angulations to reconstruct structures such as arterial vessels. One method of doing this is to mark a set of points at corresponding locations in two images taken at two different C-arm orientations. This can be reconstructed as a set of 3D points by a remote navigation system computer. Furthermore, spline curves can be constructed to fit these points to represent the centerline of the vessel or to construct a vessel tree in three dimensions. While this may require the user to click on several points to perform the reconstruction, a 3D reconstruction from at least two contrast agent-enhanced 2D images could also be performed through image processing means in order to extract a 3D centerline vessel or vessel tree, as is done in some commercially available image processing systems. In the following, we shall refer to this type of 3D data reconstruction, whether based on user marking or on image processing, as 2D-image-derived data.

A registration between the 3D anatomical data and the 2D-image-derived data can be performed using one or more of the methods described in the following. Such a registration is needed by any remote navigation system that uses the 3D anatomical data as information for assisting device navigation.

In one embodiment, the user marks pairs of points near a branch on each of the vessels that meet at a branch of the vessel or network of vessels, on the at least 2 X-ray images. This pair of points in effect defines the take-off orientation of that vessel at the branch. Similar points are picked on the surface of corresponding vessels in the 3D anatomical data, and the software finds corresponding points on the vessel centerline, as described in the algorithm description. At least three vessels, not all in the same plane, need to be marked in this manner to find a suitable transformation matrix that effects a registration between the two sets of data using the marked pairs of points. The registration could be done as landmark registration by directly associating corresponding points in a best-fit manner (using the standard Procrustes algorithm, for instance), or by finding the best-fit orientation that minimizes total orientation error of the picked vessel take-offs with the cost function approach given in the algorithm description.

In a second embodiment, the software could reconstruct the 3D vessel centerline and display it as a 3D model, possibly as a tubular surface, in a 3D window on a Graphical User Interface. The user could select pairs of points as described above, directly on the 3D model, and these could be used for the registration. In this case the 2D images are not directly used to perform the registration with the 3D anatomical data; instead the 3D reconstruction derived from the 2D images is.

In a third embodiment, the user marks at least 4 non-coplanar branch points in the 2D-image-derived data (which could either be directly the 2D images, or a 3D reconstruction derived from 2D images, as described above), and corresponding branch points in the 3D anatomical data. The software then performs a landmark registration between the data sets using the branch points as landmark points, using a standard method such as the Procrustes algorithm.

In a fourth embodiment, the user could mark a set of branch points and at least one direction corresponding to a vessel take-off orientation at a branch, and the software performs a best-fit registration based on finding a rigid transformation that minimizes a weighted sum of cost functions based on distances and orientations respectively.

The method of the various embodiments initially calls for the user to mark on at least two X-ray image planes two points on an anatomical vessel that provide a linear indication of the local direction of the vessel, which two anatomical vessel points have coordinates $y_1$ and $y_2$. The method then analyzes a three-dimensional image such as shown in FIG. 1 having a series of cross-sectional images 20 of a volume that was regularly sampled at some constant interval to create an image pixel data set that is utilized by image modeling software. The spaces 22 between each section are filled in so that the pixel data take on additional dimension and become volume pixels, or voxels. Because the voxels have the capacity of obscuring the view of other voxels in other sections, the voxel opacity value is preferably altered by changing the intensity of the voxel. Voxels with intensity values of zero are treated as completely transparent, and higher voxel values are more opaque.

A Gaussian blurring operation may be applied to the initial segmented three-dimensional volumetric data to provide a weighted mask or filter in the processing of the image intensity of the image voxels. Let $I(l, m, n)$ be the image intensity at the voxel indexed by $(l, m, n)$. We can then set:

$$K_i = \frac{K'}{\sum_{j=-2}^{2} K'_j}, \text{ where } K'_{-2} = e^{\frac{-4}{2\sigma^2}}, K'_{-1} = e^{\frac{-1}{2\sigma^2}},$$

$$K'_0 = 1, K'_1 = K'_{-1}, K'_2 = K'_{-2} \text{ and}$$

$$I_1(l, m, n) = \sum_{i=-2}^{2} K_i I_1(l+i, m, n), \text{ followed by}$$

$$I_2(l, m, n) = \sum_{i=-2}^{2} K_i I_1(l, m+i, n), \text{ and then}$$

$$I_3(l, m, n) = \sum_{i=-2}^{2} K_i I_1(l, m, n+i)$$

Figure 2:
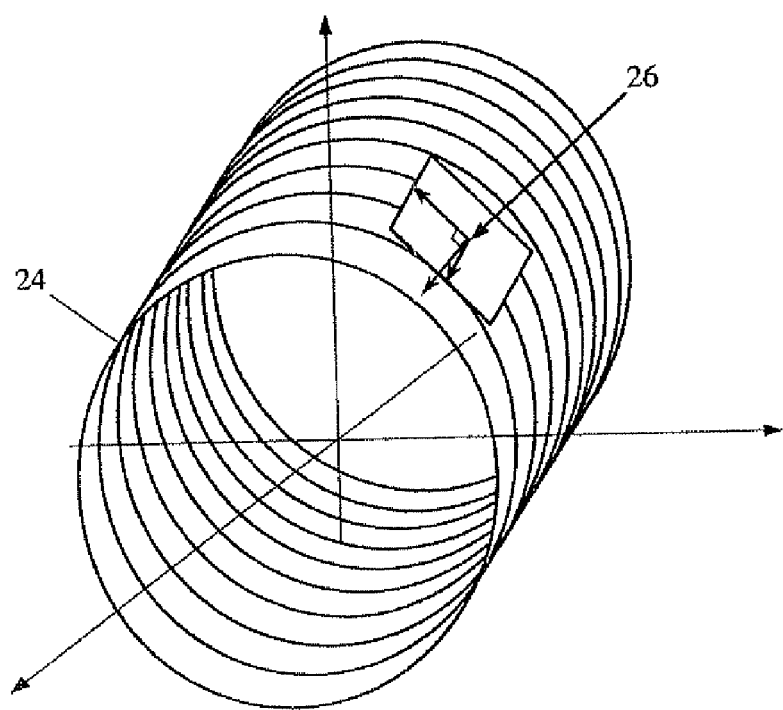
FIG. 2 is a rendering of a three-dimensional volumetric image of a vessel of a subject body.

The processing of voxel intensity enables rendering of a blurred image of the three-dimensional image volume. An example of a three-dimensional rendering is depicted in FIG. 2, which shows a section of a vascular vessel 24 having curved surfaces. The method comprises selecting and converting a surface point on the vessel 24 to a point in the center of the vessel by the use of a suitable algorithm. Many imaging software programs utilized in processing three-dimensional volumetric images allow the user to "snap to surface" for selecting a desired surface point on a rendered three-dimensional image. For surface point 26, the tangents to the curves of the surface at the point all lie on a tangent plane, and a local gradient direction for the three-dimensional image voxel indices at point 26 may be determined by:

$$grad_x I_3(l, m, n) = 1/2[I_3(l+1, m, n) - I_3(l-1, m, n)] \quad (1)$$

-continued $$grad_y I_3(l, m, n) = 1/2[I_3(l, m+1, n) - I_3(l, m-1, n)]$$

$$grad_z I_3(l, m, n) = 1/2[I_3(l, m, n+1) - I_3(l, m, n-1)],$$

which leads to $$G = [(grad_x I_3)^2 + (grad_y I_3)^2 + (grad_z I_3)^2]$$

$$\vec{n} = \frac{1}{\sqrt{G}}(grad_x I_3, grad_y I_3, grad_z I_3)$$

Equation (1) above is a unit vector $\vec{n}$ indicating the local gradient direction. Starting at point $p_1$ (26), the algorithm picks successive voxels in the direction of $\vec{n}$ corresponding to the local gradient direction. If the line of successive voxels intersects a predetermined consecutive number of zero-value voxels (transparent), then the algorithm goes back to point $p_1$ and proceeds to pick successive voxels in the direction of $-\vec{n}$. In the preferred embodiment the predetermined consecutive number N of zero values is about 10 to 15 voxels. The algorithm proceeds in either direction of travel from point $p_1$ until a gradient value of at least a predetermined fraction of the gradient magnitude at point $p_1$ is encountered, where such point is also a local maximum and at least a predetermined distance from point $p_1$. For example, the gradient may be about 0.75 the gradient magnitude $G_{ijk}$ at point $p_1$, and a minimum distance of about 5 millimeters from $p_1$ corresponding to a typical pulmonary vein. This point $p_1'$ is representative of the diametrically opposite side of the vessel or pulmonary vein from $p_1$ on the chosen image section. The center of the vessel $x_1$ can then be defined by:

$$\vec{x}_1 = \frac{1}{2}(\vec{x}_{P1} + \vec{x}_{P'1}) \quad (2)$$

The above procedure is repeated for a second point $p_2$ on the vessel, to obtain a second center point in the vessel, $x_2$. The method then determines the line from $x_1$ to $x_2$, which will be used as inputs to a registration algorithm. In a second embodiment of the present invention, the software algorithm is further capable of automatically fitting or constructing a centerline for the vessel, which would yield the same direction of the vessel as the above method for determining the line from $x_1$ to $x_2$. In either embodiment, the line from $x_j$ to $x_2$ provides a pulmonary vein direction, and is defined by:

$$\vec{m}_1 = \frac{(\vec{x}_2 - \vec{x}_1)}{|\vec{x}_2 - \vec{x}_1|} \quad (3)$$

The two anatomical vessel points that the user marked on an X-ray image comprise endpoints having coordinates $y_1$ and $y_2$. The method then proceeds to determine a rigid transformation that takes the set $\{\vec{n}, \vec{y}\}$ to the set $\{\vec{m}, \vec{x}\}$ as closely as possible. First, a rotation matrix R that takes $\vec{n}$ to $\vec{m}$ is found by initially defining a cost function C:

$$C_0 \equiv \sum_{i=1}^{N} (\vec{m}_i - R\vec{n}_i)^T (\vec{m}_i - R\vec{n}_i) = 2\sum_{i=1}^{N} (-\vec{m}_i^T R\vec{n}_i) \quad (4)$$

Figure 3:
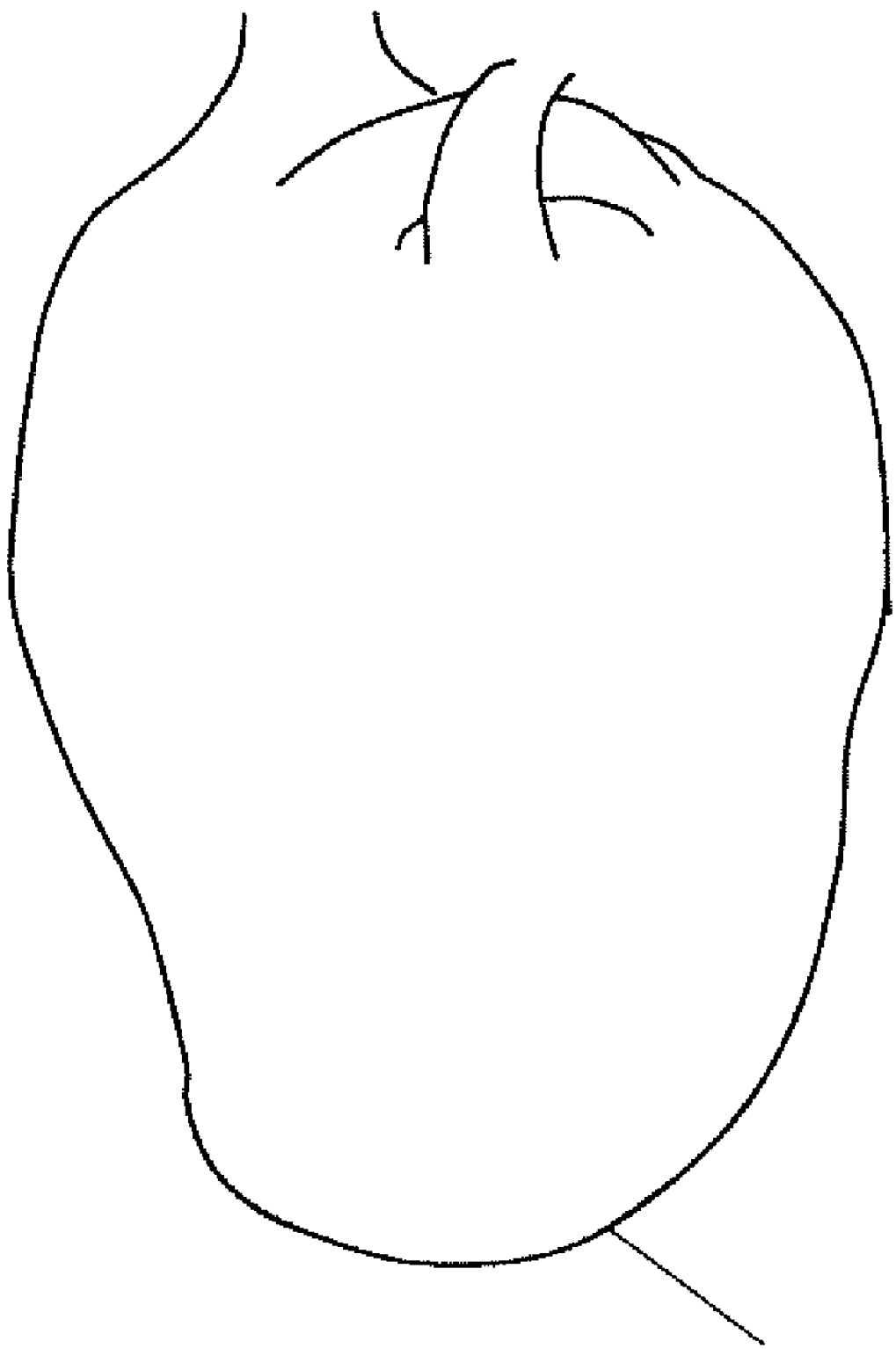
FIG. 3 is an illustration of a heart and corresponding pulmonary veins having points that may be used to obtain a suitable registration of a pre-operative three-dimensional image of a heart with an X-ray image in accordance with the principles of the present invention.

The rotation matrix R can be found by minimization of the cost function C using a variety of standard computational methods known to those skilled in the art. The rotation matrix R can then be used to perform a rigid transformation of the three-dimensional image data points to the X-ray image coordinates, for providing a suitable registration of the three-dimensional vessel image with an X-ray image. The vessel registration method may be used, as an example, to mark points on the pulmonary veins in a three-dimensional pre-operative image of a heart 30 as shown in FIG. 3, and navigating a catheter tip to correspondingly mark the same pulmonary vein points in an X-ray image to obtain a registration of a pre-operative heart image.

This method of aligning a pre-operative 3D data set to an intra-operative data set reconstructed from 2D image data is especially useful for registration of vessel trees, where typically vessel take-off orientations at branch points are easily identified by a user. In this case, a good registration of the respective vessel trees, or portion thereof, can be determined as a best-fit reorientation based on minimization of C (as described above) followed by a simple (best-fit) translation to match up (at least one) corresponding branch point(s).

Alternatively a Procrustes-type method can be employed to find the best rigid transformation (a combination of a rotation and translation) that match up corresponding landmark points in the two datasets. This method is useful for chamber-type objects, possibly with vessel-type structures emanating from the chambers. The registration of a three-dimensional image 20 will allow, among other things, overlay of a visual representation of a pre-operative image object onto an X-ray image plane, which can serve as both a visual tool and an aid in surgical navigation. The method involves pre-processing the three-dimensional pre-operative image data set to obtain a set of at least two points on the three-dimensional vessel image that provide directional information.

The advantages of the above described embodiment and improvements should be readily apparent to one skilled in the art, as to enabling determining a transformation for use in obtaining registration of a three-dimensional image object with an X-ray image display. Additional design considerations may be incorporated without departing from the spirit and scope of the invention. Accordingly, it is not intended that the invention be limited by the particular embodiment or form described above, but by the appended claims.

What is claimed is:

1. A method for obtaining registration of a three-dimensional pre-operative image data set of an anatomical vessel tree with corresponding intra-operative image data reconstructed from two-dimensional images of the vessel tree obtained in an X-ray imaging system, comprising:
    determining the orientation direction of a vessel from a three-dimensional pre-operative image data set, and
    determining the orientation direction of the vessel from the X-ray image planes by identifying on at least two X-ray images at least two X-ray image data points on the vessel that provide a linear indication of the local direction of the vessel in the X-ray image planes, from which an orientation direction of the vessel is defined, and
    determining a transformation of the three-dimensional image data to obtain a best fit registration of the direction derived from the pre-operative image data set with the direction derived from the X-ray image data points.

2. A method for obtaining registration of a three-dimensional pre-operative image data set of an anatomical vessel tree with corresponding intra-operative image data reconstructed from two-dimensional images of the vessel tree obtained in an X-ray imaging system, where the method comprises:

the user identifying at least one pair of points on an anatomical vessel on at least two X-ray image planes that provide a linear indication of the local direction of the vessel in the X-ray image planes, from which an orientation direction of the vessel is defined;

the user identifying two similar points on the surface of the corresponding three-dimensional anatomical image data;

determining the orientation direction of the vessel from the two user identified image data surface points, and determining the orientation direction of the vessel from the at least one pair of points obtained from the X-ray image planes, and calculating a transformation of the three-dimensional image data to obtain a best fit registration of the direction derived from the image surface points with the direction derived from the X-ray image data points.

3. The method of claim 2 wherein the at least two X-ray image planes provide three-dimensional coordinates for the two user identified points that are used to determine the orientation direction of the anatomical vessel in the X-ray image planes.

4. The method of claim 2 wherein the determination of the orientation direction of the image data points comprises determining the center line of the vessel from the two surface points of the three-dimensional vessel image.

5. The method of claim 4 wherein the transformation comprises a rotation matrix for aligning the three-dimensional image vessel centerline with the direction of the X-ray image vessel.

6. The method of claim 5 wherein a rotation matrix is determined based on a minimized cost function that determines a best fit rotation matrix for registering the three-dimensional data with the two-dimensional X-ray image data.

7. The method of claim 6 further comprising the overlaying the three-dimensional image data onto the X-ray image planes.

8. A method for obtaining registration of a three-dimensional image data set of an anatomical vessel with a corresponding two-dimensional image data of the vessel in an X-ray imaging system, where the method comprises:

identifying two points on an anatomical vessel on at least two two-dimensional X-ray image planes that provide a linear indication of the local direction of the vessel in the X-ray image planes, from which an orientation direction of the vessel is defined, automatically determining a centerline for the corresponding three-dimensional image data of the vessel using a software algorithm, determining a direction of the vessel from the two points obtained from the X-ray image planes, and calculating a transformation of the centerline direction derived from the three-dimensional image data to the direction derived from the X-ray image data points to obtain a registration of the three-dimensional image data with the two-dimensional image data of the X-ray imaging system.

9. The method of claim 8 wherein the transformation comprises a rotation matrix for aligning the three-dimensional image vessel centerline with the direction of the X-ray image vessel.

10. The method of claim 8 wherein a rotation matrix is determined based on a minimized cost function that determines a best fit rotation matrix for registering the three-dimensional data with the two-dimensional X-ray image data.

11. The method of claim 10 further comprising the overlaying the three-dimensional image data onto the X-ray image planes.

12. The method of claim 11 wherein the three-dimensional image data is a pre-operative image data of at least one pulmonary vein.

13. The method of claim 11 wherein the three-dimensional image data is a pre-operative image data of a heart and two or more pulmonary veins.

14. A method for obtaining registration of a three-dimensional image data set with the two-dimensional image data set of an X-ray imaging system, the method comprising:

identifying two points on an anatomical vessel on at least two X-ray image planes that provide a linear indication of the local direction of the vessel in the X-ray image planes, from which an orientation direction of the vessel is defined;

processing the three-dimensional image data to obtain a rendering of the anatomical vessel surfaces;

identifying two similar points on the vessel surface from the corresponding three-dimensional anatomical image data on the vessel;

determining a centerline of the rendered three-dimensional vessel from the identified surface points;

defining a rotation matrix for performing a transformation of the three-dimensional vessel centerline onto the direction of the vessel identified from the X-ray image planes; and calculating a best fit rotation matrix using a minimized cost function to obtain a registration of the three-dimensional anatomical image data set with the two-dimensional X-ray imaging system data.

* * * * *